United States Patent
Yoshii et al.

(10) Patent No.: US 6,752,500 B1
(45) Date of Patent: Jun. 22, 2004

(54) REAR SURFACE PROJECTION TYPE DISPLAY DEVICE

(75) Inventors: Syoichi Yoshii, Osaka (JP); Takahiro Totani, Nara (JP); Hideyuki Kanayama, Kyoto (JP); Kenji Tateishi, Osaka (JP)

(73) Assignee: Sanyo Electric Co., LTD, Moriguchi (JP)

( * ) Notice: Subject to any disclaimer, the term of this patent is extended or adjusted under 35 U.S.C. 154(b) by 139 days.

(21) Appl. No.: 10/048,449

(22) PCT Filed: Aug. 4, 2000

(86) PCT No.: PCT/JP00/05277
§ 371 (c)(1),
(2), (4) Date: Feb. 4, 2002

(87) PCT Pub. No.: WO01/11425
PCT Pub. Date: Feb. 15, 2001

(30) Foreign Application Priority Data

Aug. 4, 1999 (JP) .................................. 11/221251
Mar. 31, 2000 (JP) .................................. 2000/096563

(51) Int. Cl.[7] .................... G03B 21/28; G03B 21/14; G03B 21/56; G03B 5/10
(52) U.S. Cl. ............... 353/78; 353/79; 353/99; 359/460; 359/449; 359/451; 359/859
(58) Field of Search ............... 353/74, 78–79, 353/98–99; 359/460, 443, 449–451, 857–859

(56) References Cited

U.S. PATENT DOCUMENTS

| | | | | |
|---|---|---|---|---|
| 3,832,032 A | * | 8/1974 | Shimada | 359/456 |
| 5,410,434 A | * | 4/1995 | Shafer | 359/858 |
| 5,871,266 A | * | 2/1999 | Negishi et al. | 353/98 |
| 6,002,826 A | * | 12/1999 | Veligdan | 385/120 |
| 6,356,388 B1 | * | 3/2002 | Geyl | 359/366 |
| 6,513,935 B2 | * | 2/2003 | Ogawa | 353/37 |
| 6,527,397 B2 | * | 3/2003 | Furuichi et al. | 353/119 |
| 6,561,649 B1 | * | 5/2003 | Burstyn | 353/8 |

FOREIGN PATENT DOCUMENTS

| | | |
|---|---|---|
| JP | 7-74090 | 3/1995 |
| JP | 9-138349 | 5/1997 |
| JP | 10-48568 | 2/1998 |
| JP | 10-111458 | 4/1998 |

* cited by examiner

*Primary Examiner*—Russell Adams
*Assistant Examiner*—Magda Cruz
(74) *Attorney, Agent, or Firm*—Armstrong, Kratz, Quintos, Hanson & Brooks, LLP

(57) ABSTRACT

A rear projection display device capable of reducing the depth of a display device itself, comprising an optical engine, first, second, third reflective mirrors arranged at such positions as to be easily held integrally with each other, a fourth reflective mirror, a plane reflective mirror for turn-back of light flux, and a screen.

6 Claims, 9 Drawing Sheets incident light from the fifth reflective mirror 7

| surface data | $f_a$=10.6 $d_1$=74.5 $d_2$=104.5 $d_3$=252.5 $F_{No}$=6.3 | | | | | |
|---|---|---|---|---|---|---|
| surface number | f | k | A | B | C | D |
| 1 | 61.2 | -0.6 | 5.08E-08 | 3.94E-12 | 3.16E-15 | -1.78E-18 |
| 2 | -80.2 | 0.0 | 0.0 | 0.0 | 0.0 | 0.0 |
| 3 | -515.0 | 0.0 | -1.69E-07 | 3.83E-12 | 6.11E-16 | -1.07E-19 |
| 4 | -92.3 | -10.0 | 5.47E-09 | -5.76E-14 | 3.32E-19 | -7.98E-25 |

Fig. 7 optical structure of first, second, third reflective mirrors 3a, 5, 6 and an auxiliary lens 9

| S | | Radius | Thickness | Glass | |
|---|---|---|---|---|---|
| liquid crystal panel 27 | | Inf | 32 | | |
| auxiliary lens 9 | incident surface | Inf | 10 | BK7 | ASP |
| | emitting surface | Inf | 142 | | ASP |
| first reflective mirror 3a | | 240.4 | 250 | | |
| second reflective mirror 5a | | 356.8 | 230 | | ASP |
| third reflective mirror 6a | | -169.7 | 520 | | ASP |
| screen 8 | | Inf | | | |

∗data of aspherical surface lens 9 : S1 k=43276, a=2.43E-6, b=8.36E-10
c=-1.14E-11, d=4.71E-16

S2 k=16541, a=2.34E-6, b=-2.48E-9
c=-2.42E-12, d=-3.77E-15 second reflective mirror 5a: k=19.16, a=1.26E-7, b=9.07E-12
c=-3.27E-14, d=1.01E-17 third reflective mirror 6a: k=-7.89, a=5.96E-9, b=-7.08E-14
c=1.71E-19, d=2.94E-24

REAR SURFACE PROJECTION TYPE DISPLAY DEVICE

TECHNICAL FIELD

This invention relates to a rear projection display device so adapted as to receive an image projected from an image projector (an optical engine) on a rear surface of a screen and to project image light toward an observer positioned in front of the screen.

BACKGROUND ART

FIG. 10 is a schematic view illustrating a structure of a conventional rear projection display device. The rear projection display device comprises an image projector (an optical engine) 102, a projection lens 103, a reflective mirror 104 and a transmission-type diffusion screen 105 in a case 101. Image light projected from the image projector 102 is projected and magnified through the projection lens 103, reflected on the reflective mirror 104 and received on a rear surface of the transmission-type diffusion screen 105. An observer can watch the image in front of the diffusion screen 105. This type of the rear projection display device has an advantage in that upsizing of a screen is easily achieved in comparison with display devices using a cathode-ray tube.

In order to realize upsizing of the screen, the above-mentioned rear projection display device requires either using the projection lens 103 with a high magnification or extending an optical path between the image projector 102 and the screen 105. The projection lens has a limit to magnification under present circumstances. When providing a projection lens of a high magnification, the case 101 also increases its depth, leading to the difficulties in slimming. When extending the optical path between the image projector 102 and the screen 105, the case 101 also increases its depth, leading the difficulties in slimming.

On the other hand, JP 111458/1998 A (Int. Cl G02B 17/00) discloses another conventional rear projection display device including an image forming system comprised of three reflective mirrors having curved surfaces.

The image forming system comprises a first reflective mirror whose reflective surface is spherical and concave in shape, a second reflective mirror whose reflective surface is aspherical and convex in shape, and a third reflective mirror whose reflective surface is aspherical and convex in shape. Image light optically modulated in a liquid crystal panel is reflected on the first to third reflective mirrors in sequence and irradiated on the screen.

The optical path is folded up by the first, second and third reflective mirrors, therefore the depth of the case can be reduced.

To make the case slimmer, however, image light should be emitted at an angle with respect to the screen, specifically; a main light beam of the image light should be emitted at an angle with respect to a normal to the screen. Under the circumstance, it is difficult to achieve power arrangement of reflective mirrors enough to correct aberrations such as astigmatism and coma only by aspherical components of the second and third reflective mirrors.

The mirror unit for forming and projecting image comprised of the first to third reflective mirrors is an optical part having a same function as that of a general projection lens. Considering efficiency of adjusting operations in assembling processes of the device, positioning accuracy of each mirror, and dust-resistance effect, it is preferable to shorten the distance between mirrors and integrally hold the mirrors in a holding body.

Each of the first to third mirrors, however, is placed in close to a front or rear side of the case. When each of the reflective mirrors is held by an integral mechanism, a holding system becomes big. Therefore it is difficult to hold the mirrors and place a dust-resistance mechanism by using the integral mechanism In a rear projection display device comprising an image displaying liquid crystal panel of about 1 inch diagonally arranged in the optical engine, and magnifying and projecting an image onto a 50 inch diagonal screen, for example, the spacing between mirrors requires 20–30 cm with consideration given to the power arrangement of each mirror and image forming performance such as MTF. Therefore, it is difficult to integrally hold every mirror. Also some problems are found in assembling efficiency of the rear projection display device, positioning accuracy of the mirrors, and dust-resistance effect.

Generally, one of the biggest problems of a reflective-type image forming optical system incorporating reflective mirrors is interference between reflected light flux and members in the device. In the display device using three reflective mirrors, the light flux, which travels from the first reflective mirror to the second reflective mirror, passes in proximity to the upper part of the optical engine, which may cause interference between the light flux and the holding system for the image forming members. That places constraint on a design of the holding system and the mirror optical system.

This invention was made to solve the above-mentioned problems and has an objective to reduce the depth of the display device.

Also, this invention has an objective to provide a rear projection display device capable of sending image light to a magnifying and projecting system without being cut off by the optical engine or the like.

Further, this invention has an objective to reduce the depth of the rear projection display device by projecting image light at an angle with respect to the screen without the first reflective mirror in an aspherical shape which is complicated to manufacture.

DISCLOSURE OF INVENTION

This invention comprises an optical engine including an image forming unit for forming image information by spaciously modulating intensity of a light flux from a lightning unit including a light source, a first reflective mirror in a concave shape arranged opposite to the optical engine to receive the light flux from the optical engine, a second reflective mirror in a convex shape arranged opposite to the first reflective mirror, a third reflective mirror in a convex shape arranged opposite to the second reflective mirror, a fourth reflective mirror in a convex shape arranged opposite to the third reflective mirror, a plane reflective mirror arranged opposite to the fourth reflective mirror, and a screen on which an image from the plane reflective mirror is displayed. The second reflective mirror is in a position in proximity to an upper part of the optical engine and closer to the first reflective mirror than the optical engine is. Also the first, second, third reflective mirrors are held in an integral holding system.

The described invention adopts four curved mirrors in all including a new curved reflective mirror arranged in proximity to the upper part of the optical engine, thereby preventing interference of the light flux reflected between reflective mirrors and the optical engine. Also the invention can improve assembling efficiency of the rear projection display device and positioning accuracy of the reflective mirrors and have dust-resistance effect by integrally holding the new reflective mirror arranged in proximity to the optical engine and other reflective mirrors around it in the holding system.

The rear projection display device according to the invention comprises an optical engine which optically modulates light emitted from a light source on the basis of image information and emits the modulated light, and projecting means for magnifying and projecting the emitted light from the optical engine through a plurality of reflective mirrors to a rear surface of the screen at an angle. In the rear projection display device which an image is observed from a front surface of the screen, the plurality of reflective mirrors includes at least one or more than one curved reflective mirror. An auxiliary lens for correcting an aberration of the curved reflective mirror to which light emitted from the optical engine is first irradiated is arranged on the way to the curved reflective mirror and closer to the optical engine.

According to such a structure, an image light emitted from the optical unit is magnified and corrected for aberration by the projection means including curved reflective mirror and the auxiliary lens, and emitted at an angle to the screen. Then, power of the curved reflective mirror, to which the light emitted from the optical engine is first irradiated and which requires the highest accuracy, is corrected by the auxiliary lens. Although the image light emitted from the optical unit is magnified in sequence as the image light travels closer to the screen, the auxiliary lens can be small because it is arranged between the optical unit and the curved reflective mirror where the light flux passing through is the smallest.

The projecting means in this invention comprises a first curved reflective mirror having a concave surface opposite to the light flux from the optical engine, a second curved reflective mirror having a convex surface opposite to the light flux from the first curved reflective mirror, a third curved reflective mirror having a convex surface opposite to the light flux from the second curved reflective mirror, a fourth reflective mirror for introducing the light flux from the third curved reflective mirror to a back surface of the screen and an auxiliary lens arranged on an optical path from the optical engine to the first curved reflective mirror.

According to such a structure, an image light emitted from the optical unit passes through the auxiliary lens, is reflected on the first curved reflective mirror, the second curved reflective mirror and the third curved reflective mirror in this order and is irradiated on the screen.

Also the invention is characterized by comprising a first curved reflective mirror having a spherical reflective surface and an aspherical auxiliary lens.

According to such a structure, the spherical reflective surface of the first curved reflective mirror is formed with high accuracy as well as the auxiliary lens which compensates aspherical components. The reflective surface and the auxiliary lens can be accurately formed by a conventional polishing method, because the reflective surface of the curved reflective mirror is spherical in shape and the auxiliary lens is relatively small.

The invention is characterized by that the second and third curved reflective mirrors have aspherical reflective surfaces.

The second and third curved reflective mirror can be formed by a conventional polishing method, because they are big in comparison with the first curved reflective mirror and require moderate accuracy.

BRIEF DESCRIPTION OF DRAWINGS

FIG. 7 is a table showing an optical structure of reflective mirrors and an auxiliary lens of the rear projection display device in FIG. 6.

BEST MODE FOR CARRYING OUT THE INVENTION

Now a description is made about this invention by referring to the attached drawings.

[First Embodiment]

Figure 1:
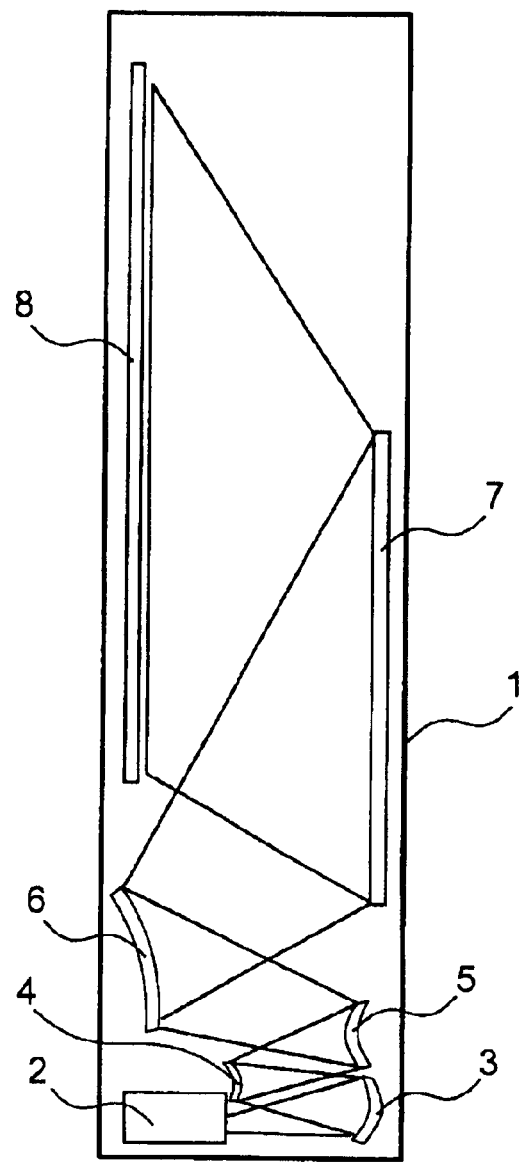
FIG. 1 is a cross sectional view illustrating a schematic structure of a rear projection display device according to a first embodiment of the present invention.
Figure 2:
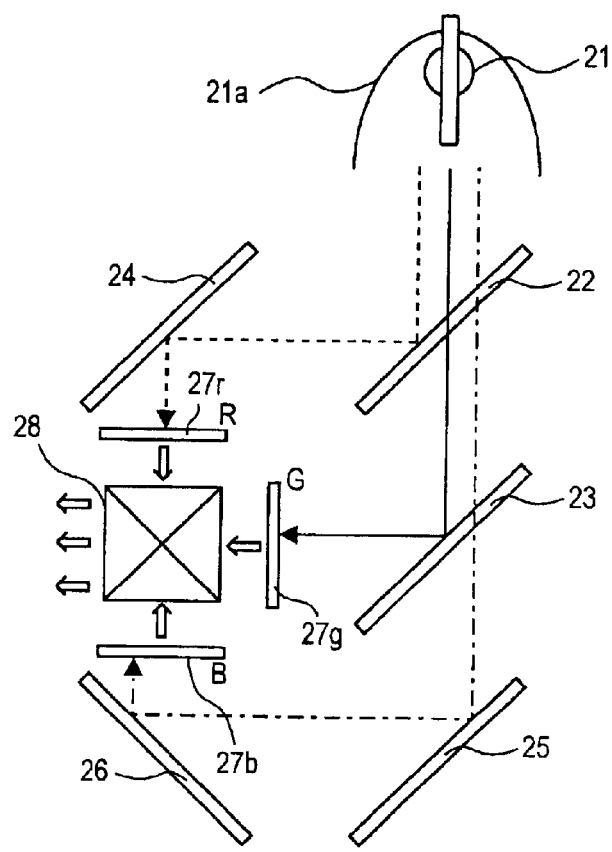
FIG. 2 is a view illustrating a schematic structure of an optical engine of the rear projection display device in FIG. 1.
Figure 3:
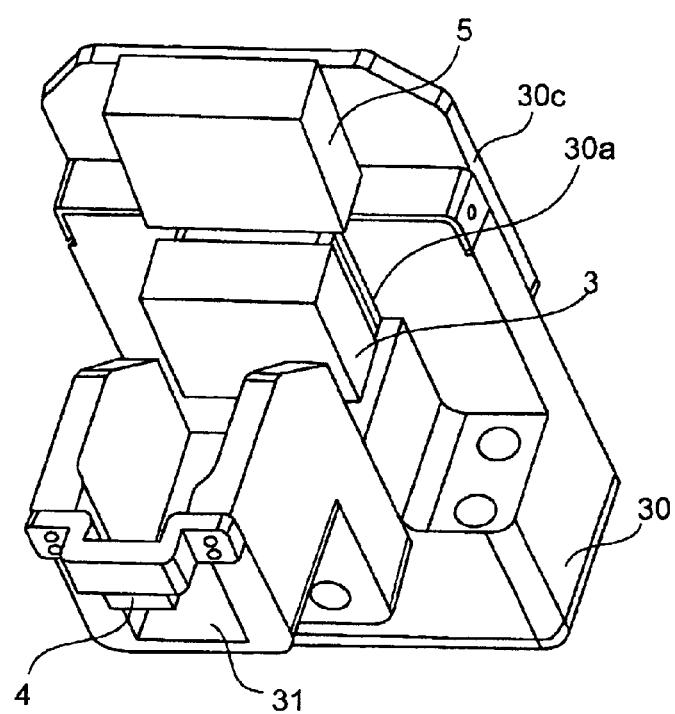
FIG. 3 is a perspective view showing an example of a state where the first, second, third reflective mirrors are held in a holding member in one-piece.
Figures 4, 5:
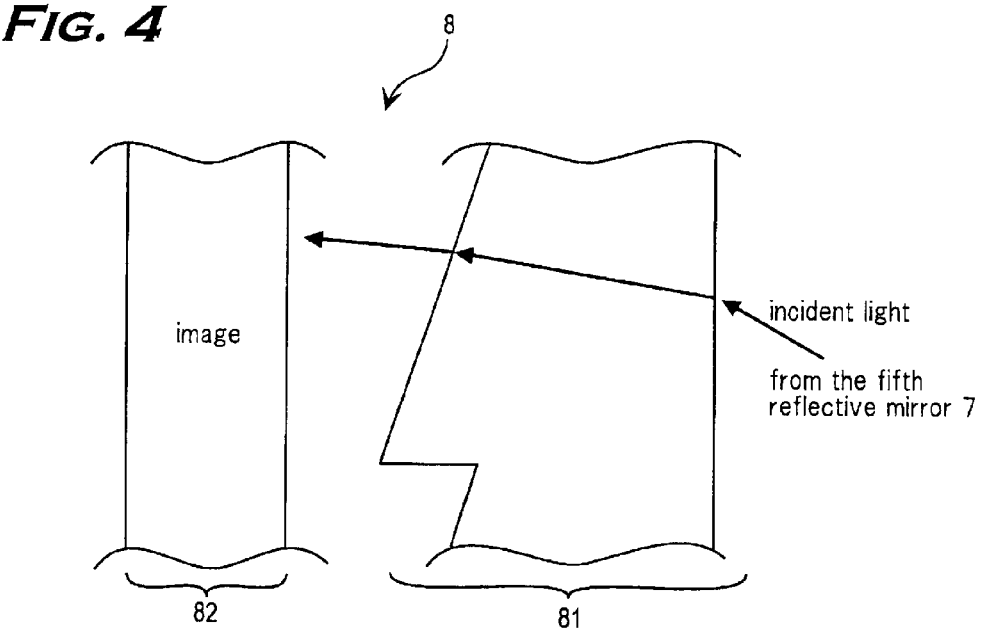
FIG. 4 is a cross sectional view enlarging a screen structure of the rear projection display device in FIG. 1.
FIG. 5 is a table showing an optical structure of reflective mirrors of the rear projection display device in FIG. 1.

FIG. 1 is a cross sectional view illustrating a schematic structure of a rear projection display device according to the present invention. FIG. 2 shows a schematic structure of an optical engine of the rear projection display device in FIG. 1. FIG. 3 is a perspective view showing an example of a state where first, second, and third reflective mirrors were held in a holding member. FIG. 4 is a cross sectional view enlarging a screen structure of the rear projection display device in FIG. 1.

A rear projection display device in the first embodiment comprises, as shown in FIG. 1, an optical engine 2 for generating image light, a screen 8 on which the image light is irradiated to form an image, a projection optical system for guiding the image light emitted from the optical engine 2 to the screen 8, and a case 1 for holding these components integrally.

The projection optical system comprises first to fourth reflective mirrors 3, 4, 5, 6, which are aspherical reflective mirrors, have the functions of magnifying, projecting, and forming image, and are placed on a same axis, and a fifth reflective mirror 7, which is a flat reflective mirror and is placed perpendicular to an optical axis to fold up the image light.

A feature of the first embodiment is that the functions of magnifying, projecting, and forming image are performed by an optimal disposition of power of three aspherical reflective mirrors and a spherical reflective mirror instead of two convex aspherical reflective mirrors and a concave aspherical reflective mirror.

A reflective surface of the first reflective mirror 3 is aspherical concave and arranged opposite to an image light emitted from the optical engine 2. The second reflective mirror 4 is spherical convex and arranged opposite to the first reflective mirror 3 in the case 1. The third reflective mirror 5 is aspherical convex and arranged opposite to the second reflective mirror 4 in the case 1. The fourth reflective mirror 6 is aspherical convex, like the third reflective mirror 5, and arranged between the third reflective mirror 5 and the screen 8. The fifth reflective mirror 7 is a flat plate and arranged above the third reflective mirror 5 and parallel to the screen 8.

The optical engine 2, as shown in FIG. 2, is one of three-plate type optical engines and comprises a metal halide lamp 21 having a reflector 21a, a first dichroic mirror 22 selectively reflecting light in a wavelength band corresponding to red and transmitting light in other wavelength band, a second dichroic mirror 23 selectively reflecting light in a wavelength band corresponding to green and transmitting light in other wavelength band, first to third liquid crystal panels 27r, 27g, 27b optically modulating each color light separated on the first and second dichroic mirrors 22 and 23 on the basis of image information, and a dichroic prism 28 synthesizing each color light modulated on the first to third liquid crystal panels 27r, 27g, 27b.

The white light emitted from the metal halide lamp 21 is reflected on the reflective mirror 21a. Then, ultra violet ray and infrared ray in the light are eliminated at an UV/IR filter (not shown), and the white light is irradiated to the first dichroic mirror 22 at an angle of 45°.

The first dichroic mirror 22 selectively reflects light having red component (thereinafter it is referred to as red light) in the irradiated white light. The reflected red light is reflected on the first reflective mirror 24 and then irradiated to the first liquid crystal panel 27r. After optically modulated on the first liquid crystal panel 27r on the basis of red image information, the red light is incident to the dichroic prism 28 for color synthesis.

Meanwhile, light having other color components is transmitted through the first dichroic mirror 22, and then is irradiated to the second dichroic mirror 23 at an angle of 45°.

The second dichroic mirror 23 selectively reflects light having green component (thereinafter it is referred to as green light) in the irradiated colored light. The reflected green light is irradiated to the liquid crystal panel 27g. After optically modulated on the second liquid crystal panel 27g on the basis of green image information, the green light is incident to the dichroic prism 28 for color synthesis.

Light having blue component (thereinafter it is referred to as blue light) is transmitted through the second dichroic mirror 23, then is reflected on the second and third mirror 25 and 26 in sequence, and irradiated to the third liquid crystal panel 27b. After optically modulated on the third liquid crystal panel 27b on the basis of blue image information, the blue light is incident to the dichroic prism 28 for color synthesis.

Each of color lights incident to the dichroic prism 28 is synthesized together to emit color image light.

The image light emitted from the dichroic prism 28, as shown in FIG. 1, is emitted slantly up to right and irradiated to a first reflective mirror 3 in an aspherical concave shape. The image light irradiated to the first reflective mirror 3 is reflected on the second to third reflective mirrors 4 in a spherical convex shape, the third reflective mirror 5 in an aspherical convex shape and the fourth reflective mirror 6 in an aspherical convex shape in sequence and irradiated to the fifth reflective mirror 7 in a flat shape. The irradiated image light to the fifth reflective mirror 7 is corrected for an aberration such as astigmatism and a comatic aberration by the lens function of the first to fourth reflective mirrors 3 to 6, and is magnified at the same time. The image light reflected on the fifth reflective mirror 7 is irradiated on a back surface of the screen 8 to form an image thereon.

As shown in FIG. 4, the screen 8 includes a fresnel lens screen 81 formed with acrylic resin and a lenticular lens screen 82. A surface of the fresnel lens screen 81 on the incident side is flat, and a surface for emitting light is made with a plurality of protrusions in a loop shape. A surface of the lenticular lens screen 82 on the incident side is flat and a surface for emitting light is made with a plurality of protrusions in a semi-cylindrical shape.

After the image light reflected on the fifth mirror 7 is irradiated at an angle to a back surface of the fresnel lens screen 81, the fresnel lens 81 corrects the angle of the image light with its lens function and emits the image light. The image light emitted from the fresnel lens is irradiated to a back surface of the lenticular lens screen 82 to form an image by the aid of the diffusing function of the lenticular lens screen 82.

In the display device using three aspherical mirrors as above-mentioned, a light flux passing through between the first mirror and the second mirror may interfere the holding system for the image forming unit because the light flux passes in proximity to the upper part of the optical engine 2. This imposes restrictions in design regarding to the mechanism and the mirror optical system.

Hence the first embodiment resolves the above-mentioned problem by an optimal disposition of power of four reflective mirrors as keeping performance of the projection mirror unit. Indicated as follows are conditions of restriction to resolve the problems.

$$D/H \ 0.65 \tag{1}$$

$$3.2 \ f_{123}/fa \ 4.3 \tag{2}$$

$$d1 + d2 \ D \tag{3}$$

D=distance between the rear mirror and the screen

H=height of the screen $f_{123}$=synthetic focal length of the first, second, third reflective mirrors fa=entire focal length (synthetic focal length of the first to fourth reflective mirrors)

d1=distance between the first reflective mirror and the second reflective mirror d2=distance between the second reflective mirror and the third reflective mirror The projection mirror system can be thinner by satisfying the conditional expressions (1) and (2). The first, second, third reflective mirrors 3, 4, 5 can be arranged close to each other by satisfying the conditional expression (3), which allows the mirrors to be integrally held.

In the above-mentioned structure, three reflective mirrors 3, 4, 5 which are arranged closely to each other can be held by an integral holding system 30 as shown in FIG. 3. The first reflective mirror 3, the second reflective mirror 4, and the third reflective mirror 5 are fixed to the holding body 30.

The holding body 30 has a window 31 through which a light flux from the optical engine 2 passes. A support section 30a is provided to install the first reflective mirror 3 in the aspherical concave shape at the position where is opposite to the window and light flax is introduced. A support section 30b is provided opposite to the first reflective mirror 3 in order to install the second reflective mirror 4 in the spherical convex shape so that the mirror 4 is positioned above the optical engine 2. A support section 30c is provided opposite to the second reflective mirror 4 to install the third reflective mirror 5 in the aspherical convex shape.

The reflective mirrors 3, 4, 5 are accurately installed to the holding body 30 by respectively fixing them to the support sections 30a, 30b, 30c of the holding body 30.

The use of the holding body 30 has advantages to maintain assembling efficiency and positioning accuracy of mirrors.

In this structure, the reflected light from the first reflective mirror 3 is reflected again on the second reflective mirror 4 just before reaching the optical engine 2. Hence, a light flux, which is supposed to pass over the optical engine 2, travels even upwardly, and a large amount of clearance for providing a mechanism above the optical engine 2 can be secured. Generally an adjustment system for installing an image forming element or the like are provided on the optical engine 2, and such a system projects from the upper part of the optical engine 2 in many cases. The first embodiment has advantages in design of systems such as the adjustment system or the like and in design of reflective mirrors for controlling a light flux and preventing the light flux from interference.

It is also possible to prevent image contrast from degrading caused by dust by placing a dust-resistant plate on the upper part on the integral holding system in FIG. 3. The dust-resistant plate is made of transparent materials and does not cut off the optical path.

Although there is no mention about the shape of the reflective mirrors having curved surfaces in the first embodiment 1, the mirrors basically should have an area large enough to reflect a light flux. Preferably, the reflective mirrors should be circle rather than rectangular in consideration of processing cost of the mirrors.

Further to the description of the first embodiment of the invention, FIG. 5 is detailed data on the structure of the image forming system designed in accordance with this invention. fa is a focal length of the entire system. Each d1, d2, and d3 is the center-to-center liner distance between the first and the second reflective mirrors, the second and the third reflective mirrors, and the third and the fourth reflective mirrors. As to data of each surface of mirror, each surface number corresponds to the first to the fourth reflective mirrors respectively. K, A, B, C, and D respectively correspond to coefficients of expression 1 expressing the shape of the aspherical reflective mirror. Data of FIG. 5 is obtained under the condition of fa=10.6, d1=74.5, d2=104.5, d3=252.5, $F_{NO}$=6.3.

[Expression 1]

$$Z = \frac{ch^2}{1+\sqrt{1-(1+k)c^2h^2}} + Ah^4 + Bh^6 + Ch^8 + Dh^{10}$$

According to the first embodiment, the rear projection display device including the reflective-type image forming optical system can avoid interference between light flux reflected by the reflective mirrors and the optical engine. Holding integrally a reflective mirror in proximity to the optical engine and the other reflective mirrors around it allows to improve assembling efficiency and positioning accuracy of the reflective mirrors and to arrange the dust-resistance system.

[Second Embodiment]

Figure 6:
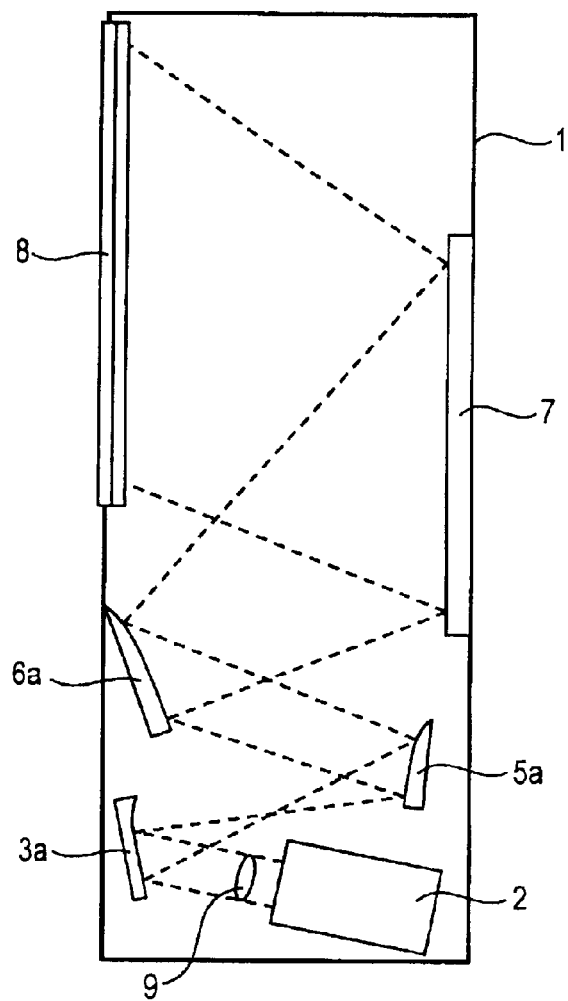
FIG. 6 is a cross sectional view illustrating a schematic structure of a rear projection display device according to a second embodiment of the present invention.

FIG. 6 is a cross sectional view showing a schematic structure of a rear projection display device according to a second embodiment of the present invention.

A rear projection display device of the second embodiment comprises, as shown in FIG. 6, an optical engine 2 for generating image light, a screen 8 on which the image light is irradiated to form an image, a projection optical system for introducing the image light emitted from the optical engine 2 to the screen 8, and a case 1 for holding these components integrally.

The projection optical system comprises first, second, third reflective mirrors 3a, 5a, 6a and an auxiliary lens 9.

A reflective surface of the first reflective mirror 3a is spherical concave and arranged opposite to an image light emitted from the optical engine 2. The second reflective mirror 5a (corresponding to the third reflective mirror 5 in the first embodiment) is aspherical convex and arranged opposite to the first reflective mirror 3a in the case 1. The third reflective mirror 6a (corresponding to the fourth reflective mirror 6 in the first embodiment) is aspherical convex, like the second reflective mirror 5a, and arranged between the first reflective mirror 3a and the screen 8 in the case 1. The fourth reflective mirror 7 (corresponding to the fifth reflective mirror 7 in the first embodiment) is a flat plate and arranged above the second reflective mirror 5a and parallel to the screen 8.

The optical engine 2, as described in the first embodiment and shown in FIG. 2, is one of three-plate type optical engines.

Image light emitted from a dichroic prism 28, as shown in FIG. 6, is emitted slantly up to left, passes through the aspherical auxiliary lens 9 and is irradiated to the reflective mirror 3a in a spherical concave shape. The image light irradiated to the first reflective mirror 3a is reflected on the second and the third reflective mirrors 5a, 6a in aspherical convex shapes in this order and irradiated to the fourth reflective mirror 7 of a flat plate. Then, the irradiated image light to the fourth reflective mirror 7 is corrected for an aberration such as astigmatism and a comatic aberration by the lens function based on shapes of the first, second, third reflective mirrors 3a, 5a, 6a and the auxiliary lens 9, and is magnified at the same time. The first, second, third reflective mirrors 3a, 5a, 6a and the auxiliary lens 9 is so designed as to build an optical structure as shown in FIG. 7.

The image light reflected on the fourth reflective mirror 7 is irradiated to the back surface of the screen 8 to form an image.

After the image light reflected on the fourth reflective mirror 7 is irradiated at an angle to the back surface of the fresnel lens screen 81, the angle of the image light is corrected by the lens function and emitted. The image light emitted from the fresnel lens is irradiated to the back surface of a lenticular lens screen 82 to form an image by the aid of the diffusing function.

As described above, the auxiliary lens 9 according to the second embodiment comprises aspherical components required of the first reflective mirror 3a which should have the most accurate surface. Therefore, it is possible to form the well-accurate first reflective mirror 3a by polishing.

The light flux is magnified in sequence after being emitted from the optical engine 2. The auxiliary lens 9 is arranged between the optical engine 2 and the first reflective mirror 3a where relatively thin light flux passes through, therefore, the auxiliary lens 9 can be made small and formed accurately by polishing.

Although, in the second embodiment, the first reflective mirror 3a of a spherical concave shape, the auxiliary lens 9 of an aspherical shape for compensating the first mirror, and the second and third reflective mirrors of aspherical convex shapes 5a, 6a are used as members of the projection optical system, the system is not limited to the members and may use three or more curved reflective mirrors.

Although, in the second embodiment, the auxiliary lens 9 is arranged between the optical engine 2 and the first reflective mirror 3a to compensate the spherical component of the first reflective mirror 3a, the auxiliary lens 9 may be arranged either between the first reflective mirror 3a and the second reflective mirror 5a or both.

According to the second embodiment, the auxiliary lens comprises aspherical components required of the curved reflective mirror which should have the highly accurate surface, thus it is possible to form the well-accurate curved reflective mirror by polishing, resulting in improvement of reliability of the device.

Figure 8:
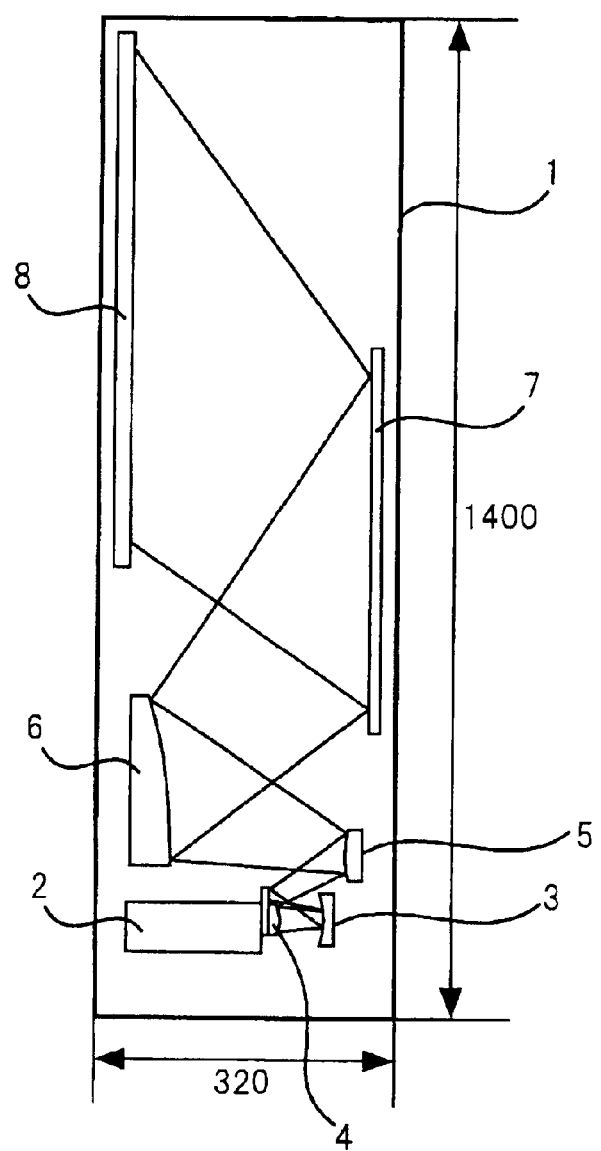
FIG. 8 is a schematic cross sectional view illustrating a rear projection display device with a 50-inch screen to which the structure in the first embodiment is applied.
Figure 9:
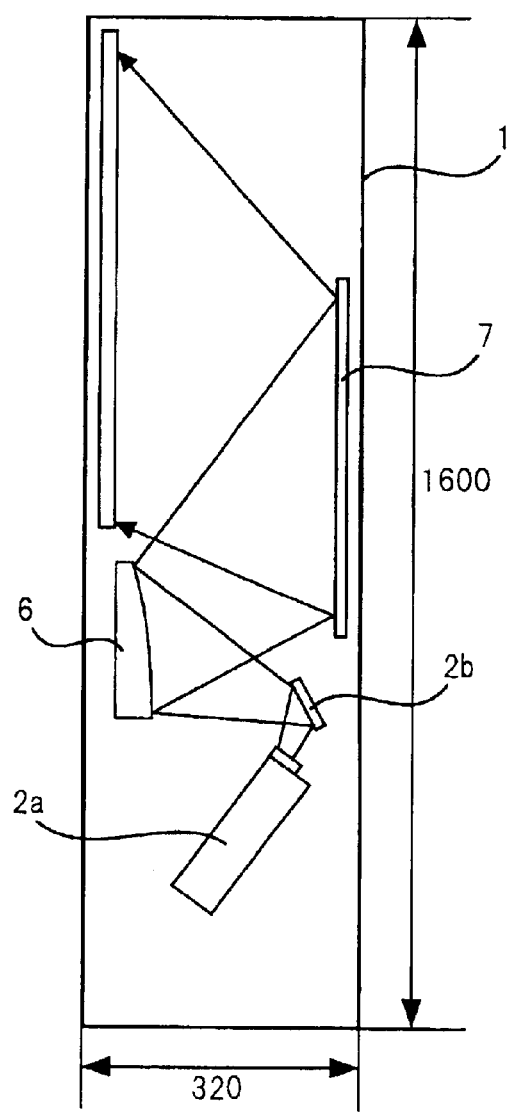
FIG. 9 is a schematic cross sectional view illustrating a rear projection display device with the 50-inch screen including an optical engine comprised of lenses.
Figure 10:
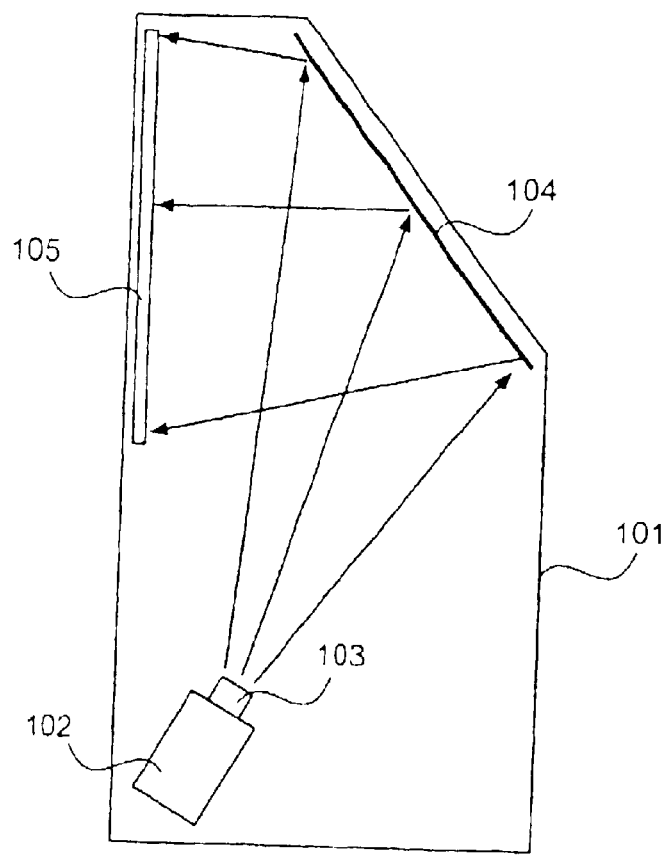
FIG. 10 is a cross sectional view illustrating a schematic structure of a conventional rear projection display device.

Now descriptions are made about a dimensional relationship of a rear projection display device with a 50-inch diagonal screen which applies the invention in the first embodiment and a rear projection display device with a 50-inch diagonal screen and an optical engine comprising lenses to perform magnification, projection and image formation instead of the first to third reflective mirror 3, 4, 5 in the first embodiment. FIG. 8 is a schematic cross sectional view showing a rear projection display device with a 50-inch diagonal screen which applies the invention of the first embodiment. FIG. 9 is a schematic cross sectional view showing a rear projection display device with a 50-inch diagonal screen and an optical engine comprising lenses. As shown in FIG. 9, image light, which is emitted from an optical engine 2a comprising lenses to perform magnification, projection, and image formation instead of the first to third reflective lenses 3, 4, 5 is reflected on a flat reflective mirror 2b and a fourth reflective mirror 6 of an aspherical convex shape, then irradiated to the fifth reflective mirror 7 of a flat plate. The image light reflected on the fifth reflective mirror 7 is irradiated to the back surface of the screen 8 to form image. When the depth of the rear projection display device in FIG. 8 is 320 mm, its height needs 1400 mm. When the depth of the rear projection display device in FIG. 9 is 320 mm, its height needs 1600 mm. Thus, the rear projection display device applying the invention of the first embodiment which comprises four reflective mirrors can be smaller.

Industrial Applicability

As described above, this invention is suitably applicable to a slim display device which receives a projected image from an image projection device (an optical engine) on a back surface of a screen and emits the image light toward an observer positioned in front of the screen, for example, a large and slim display device and a large and slim television device.

What is claimed is:

1. A rear projection display device comprising:
   an optical engine comprising an image forming unit for forming image information by spaciously modulating intensity of light flux from a lighting unit including a light source;
   a first reflective mirror in a concave shape arranged opposite to the optical engine to receive the light flux from the optical engine;
   a second reflective mirror in a convex shape arranged opposite to the first reflective mirror;
   a third reflective mirror in a convex shape arranged opposite to the second reflective mirror;
   a fourth reflective mirror in a convex shape arranged opposite to the third reflective mirror;
   a plane reflective mirror arranged opposite to the fourth reflective mirror; and
   a screen on which an image from the plane reflective mirror is displayed, wherein
   the second reflective mirror is in a position in proximity to an upper part of the optical engine and closer to the first reflective mirror than the optical engine is; and
   the first, second, third reflective mirrors arc held in an integral holding system.

2. A rear projection display device which an image is observed from a front surface of a screen, comprising:
   an optical engine which optically modulates light emitted from a light source on the basis of image information and emits the modulated light; and
   projecting means for magnifying and projecting image light from the optical engine through a plurality of reflective mirrors to a back surface of a screen at an angle, wherein
   the reflective mirrors include at least one or more than one curved reflective mirror,
   an auxiliary lens for correcting an aberration of the curved reflective mirror to which light emitted from the optical engine is first irradiated is arranged on the way to the curved reflective mirror and closer to the optical engine.

3. A rear projection display device which an image is observed from a front surface of a screen, comprising:
   an optical engine which optically modulates light emitted from a light source on the basis of image information and emits the modulated light;
   projecting means for magnifying and projecting image light from the optical engine through a plurality of reflective mirrors to a back surface of a screen at an angle, wherein the reflective mirrors include at least one or more than one curved reflective mirror; and
   an auxiliary lens for correcting an aberration of the curved reflective mirror to which light emitted from the optical engine is first irradiated is arranged on the way to the curved reflective mirror and closer to the optical engine, wherein the projecting means comprises a first curved reflective mirror having a concave surface opposite to light flux from the optical engine, a second curved reflective mirror having a convex surface opposite to the light flux from the first curved reflective mirror, a third curved reflective mirror having a convex surface opposite to the light flux from the second curved reflective mirror, a fourth reflective mirror introducing the light flux from the third curved reflective mirror to a back surface of the screen and an auxiliary lens arranged on an optical path from the optical engine to the first curved reflective mirror.

4. The rear projection display device according to claim 3, wherein
   the first curved reflective mirror has a spherical reflective surface and the auxiliary lens is aspherical.

5. The rear projection display device according to claim 3, wherein
   the second and third curved reflective mirrors have aspherical reflective surfaces.

6. A rear projection display device which an image is observed from a front surface of a screen, comprising:
   an optical engine which optically modulates light emitted from a light source on the basis of image information and emits the modulated light; and
   projecting means for magnifying and projecting image light from the optical engine through a plurality of reflective mirrors to a back surface of a screen at an angle, wherein
   the reflective mirrors include at least one or more than one curved reflective mirror,
   at least one or more than one auxiliary lens having a function of the curved reflective mirror and correcting an aberration of the curved reflective mirror are arranged closer to the optical engine,
   image light emitted from the lens is sent to the curved reflective mirror through the reflective mirrors to magnify the image, and
   the magnified image light is introduced to the back surface of the screen by the reflective mirror.

* * * * *